(12) United States Patent
Chen et al.

(10) Patent No.: US 8,687,384 B2
(45) Date of Patent: Apr. 1, 2014

(54) SWITCHING POWER SUPPLY DEVICE

(75) Inventors: Jian Chen, Matsumoto (JP); Masayuki Yamadaya, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 302 days.

(21) Appl. No.: 13/292,337

(22) Filed: Nov. 9, 2011

(65) Prior Publication Data
US 2012/0113689 A1 May 10, 2012

(30) Foreign Application Priority Data

Nov. 9, 2010 (JP) ................................ 2010-250846

(51) Int. Cl.
*H02M 3/335* (2006.01)
(52) U.S. Cl.
USPC .......................................... 363/19; 363/21.06
(58) Field of Classification Search
USPC ......... 363/16–20, 21.04, 21.06, 21.14, 21.15, 363/81, 84, 89, 95, 97, 127; 323/222, 237, 323/271, 274, 276, 282–284
See application file for complete search history.

(56) References Cited

U.S. PATENT DOCUMENTS

| | | | | |
|---|---|---|---|---|
| 5,170,099 A | * | 12/1992 | Ueoka et al. | 315/291 |
| 5,289,045 A | * | 2/1994 | Lavin et al. | 307/64 |
| 7,345,895 B2 | * | 3/2008 | Zhu et al. | 363/21.12 |
| 2006/0109692 A1 | | 5/2006 | Usui et al. | |
| 2009/0290386 A1 | * | 11/2009 | Ikeda et al. | 363/19 |

FOREIGN PATENT DOCUMENTS

| | | |
|---|---|---|
| JP | 2006-149104 A | 6/2006 |
| JP | 2008-245419 A | 10/2008 |

* cited by examiner

*Primary Examiner* — Rajnikant Patel
(74) *Attorney, Agent, or Firm* — Rabin & Berdo, P.C.

(57) ABSTRACT

A switching power supply device that includes a feedback terminal to which a feedback signal according to a load state is input, and a comparator which compares a terminal voltage of the feedback terminal with a reference voltage and determines whether the load state is a normal load state or a light load state. The switching power supply device also includes pull-up resistors which are connected to the feedback terminal, a switch element which switches resistance values of the pull-up resistors according to the change of the load state, and a switch element which switches the resistance values of the pull-up resistors according to whether the input voltage is high or low.

8 Claims, 16 Drawing Sheets

FIG. 7

| OPERATION MODE | MODE 1 | MODE 2 | MODE 3 | MODE 4 |
|---|---|---|---|---|
| ON/OFF WIDTH | $ts > ts\_ref1$ | $ts < ts\_ref1$<br>$ts > ts\_ref2$ | $ts < ts\_ref2$ | $ts < ts\_ref1$<br>$ts > ts\_ref2$ |
| NUMBER OF BOTTOMS | 1 | 1 | 2 | 2 |
| LOAD AREA | $Po > Pa$ | $Pa > Po > Pc$ | $Po < Pd$ | $Pb > Po > Pd$ |

SWITCHING POWER SUPPLY DEVICE

CROSS REFERENCE TO RELATED APPLICATION

The entire disclosure of the inventor's corresponding Japanese patent application, Serial No. JP PA 2010-250846, filed Nov. 9, 2010, is hereby incorporated by reference.

BACKGROUND OF THE INVENTION

1. Field of the Invention

The present invention relates to a switching power supply device which includes a light load intermittent oscillation (burst mode) handling circuit.

2. Description of the Related Art

In a switching power supply device, since a switching loss becomes noticeable at the time of a light load, particularly, during standby mode, it is effective to decrease the number of switching operations per second to decrease the consumption of power. Therefore, a control system that is called an intermittent oscillation (burst mode) is preferably used as a means for decreasing the number of switching operations.

FIG. 13 illustrates the configuration of a switching power supply device adopting a burst mode control system, disclosed in Japanese Patent Application Laid-Open (JP-A) No. 2008-245419. The switching power supply device is configured as a converter of a flyback system.

In FIG. 13, the output voltage of an alternating current power supply AP1 is full-wave rectified by a diode stack DS1, is smoothed by a capacitor C10, and becomes a direct current voltage Vi. The direct current voltage Vi is supplied to a primary winding N1 of an output transformer T10 through a power MOS transistor Q10 and a sense resistor R15 used for current detection. The power MOS transistor Q10 is turned on/off by a gate drive signal from a power supply control IC 100. This causes a pulse flow to be generated in the secondary winding N2 of the output transformer T10. The pulse flow is rectified by a diode D11, is smoothed by a capacitor C20, and is supplied to a load (not illustrated in the drawings).

A voltage that is output to the load is divided by resistors R11 and R12 and detected. The detected voltage (in the strict sense, a signal obtained by amplifying the difference between the detected voltage and a reference voltage) is input as a feedback signal to an FB terminal of the power supply control IC 100 through a photo coupler PC1.

Meanwhile, if a current flows through the secondary winding N2 of the output transformer T10, a voltage is also generated in an auxiliary winding N3. This voltage is rectified by a diode D12, is smoothed by a capacitor C30, and is supplied to a Vcc terminal serving as a power supply terminal of the power supply control IC 100.

The connection point of the diode D12 and the capacitor C30 is connected to a ZCD terminal of the power supply control IC 100 through a resistor R13. The connection point of the power MOS transistor Q10 and the sense resistor R15 for current detection is connected to an IS terminal (a terminal used to input a detection value of the current flowing through the power MOS transistor Q10) of the power supply control IC 100.

The power supply control IC 100 includes a GND terminal, an OUT terminal which outputs a gate drive signal (a switching pulse) of the power MOS transistor Q10, and a VH terminal which supplies a current from a high voltage system to the Vcc terminal. C40 and C50 indicate capacitors, ZD1 indicates a shunt regulator, and R14 indicates a resistor for current restriction.

The power supply control IC 100 outputs a gate drive signal according to a load state, on the basis of the feedback signal input to the FB terminal to control switching of the power MOS transistor Q10 with the gate drive signal. FIG. 14 is a circuit diagram illustrating the configuration of the power supply control IC 100.

In FIG. 14, a burst circuit 101 includes a comparator OP1, pull-up resistors R101 and R102, and a switch element SW1. In the comparator OP1, a positive input terminal is connected to the FB terminal and a negative input terminal is connected to a reference voltage source that generates a burst threshold voltage Vth. The pull-up resistor R101 is connected between a Vreg power supply terminal, to which an output voltage Vreg of a regulator (not illustrated in the drawings) is applied, and the FB terminal. The pull-up resistor R102 is connected between the Vreg power supply terminal and the FB terminal through a switch element SW10.

With this configuration, the comparator OP1 compares a partial voltage (that is, voltage Vfb) obtained by dividing the voltage Vreg by pull-up resistances (R101 and R102) and by on resistance of a photo transistor (see FIG. 13) of the photo coupler PC1 externally attached to the FB terminal, with the burst threshold voltage Vth. The voltage Vfb of the FB terminal becomes lower than the voltage Vreg by the amount of voltage dropped due to the pull-up current (and the pull-up resistances).

An output of the comparator OP1 is input to the output control circuit 102 which controls switching of the switching power supply and is also input to the switch element SW10 as a control signal.

The voltage Vfb of the FB terminal is also input to the output control circuit 102. In addition, a signal from the IS terminal, a signal from the ZCD terminal, and an output signal of an under voltage lockout (UVLO) circuit 103 are input to the output control circuit 102. The output control circuit 102 generates a signal which controls turning on/off the power of the MOS transistor Q10 which is a switching element, from these signals. The signal is output from the OUT terminal through a driver 104.

More specifically, the output control circuit 102 detects the valley portion of the signal that is input to the ZCD terminal and determines the start of an on-period of the power MOS transistor Q10. In a normal operation, if the signal from the IS terminal becomes equal to the voltage Vfb (or divided voltage thereof) of the FB terminal or equal to an internal reference voltage, the power MOS transistor Q10 is turned off and the on-period ends. When a signal of a low (L) level is input from the burst circuit 101 or a signal, which represents detection of an abnormally low voltage, is input from the UVLO circuit 103, the output control circuit 102 stops the output of the signal which turns on/off the power MOS transistor Q10.

The input terminal of a start circuit 105 is connected to a VH terminal and the output terminal thereof is connected to the Vcc terminal. An input of the start circuit 105 and/or an input to the Vcc terminal become/becomes an internal power supply of the power supply control IC 100. The UVLO circuit 103 receives the power supply voltage Vcc from the Vcc terminal, compares the received voltage with the reference voltage, and performs control of stopping an on/off operation of the power MOS transistor Q10 in an abnormally low voltage state.

The switching power supply device illustrated in FIG. 13 performs the operation of a light load→an increase in an output voltage (since a load current flowing from the capacitor C20 decreases, a current supplied from the secondary winding N2 of the output transformer T10 increases, which increases an output voltage which is a voltage between both ends of the capacitor C20)→an increase in a light emitting amount of an LED of the photo coupler PC1→a decrease in the on resistance of the photo transistor of the photo coupler PC1→a decrease in the voltage Vfb of the FB terminal. This is because an element (photo transistor) where the resistance value decreases when a load becomes light is connected to the FB terminal and the FB terminal is connected to the Vreg terminal through the pull-up resistors R101 and R102 illustrated in FIG. 14. One pull-up resistor R102 is disconnected by the switch element SW10. This causes the burst circuit 101 to enter a state of hysteresis.

In a normal operation mode other than an ultra-light load state, the voltage Vfb of the FB terminal is Vfb>Vth. In this case, since the output level bur of the comparator OP1 becomes a high (H) level, the power supply control IC 100 performs a switching operation and the switch element SW10 is turned on. Therefore, if resistance values of the pull-up resistors R101 and R102 are set to r1 and r2, the pull-up current Ifb1 in the normal operation mode is represented by the following Equation.

$$Ifb1=(Vreg-Vfb)/(r1 \cdot r2/(r1+r2)) \quad (1)$$

In the light load mode that is the ultra-light load state, the voltage Vfb of the FB terminal is in the state of Vfb<Vth. In this case, since the output level of the comparator OP1 becomes the L level, the power supply control IC 100 stops the switching operation and the switch element SW10 is turned off. Therefore, the pull-up current Ifb0 in the light load mode is represented by the following Equation.

$$Ifb0=(Vreg-Vfb)/r1 \quad (2)$$

As such, the pull-up current of the FB terminal is switched according to a detection level of the light load. In addition, overshoot or undershoot is generated in the voltage Vfb of the FB terminal due to switching. In the switching power supply device having the above configuration, an intermittent operation frequency having a long cycle is obtained which gives continuous pulses during an overshoot period and stops the switching operation during an undershoot period.

In the undershoot period, since the switching is stopped and hence power is not supplied from the primary side to the secondary side, the voltage Vfb increases halfway and the switching operation restarts when the voltage Vfb becomes more than the voltage Vth. If the overshoot period arrives and the switching operation restarts, power that is more than the power consumed by the load is supplied from the primary side to the secondary side. Therefore, the voltage Vfb decreases halfway and the switching operation is stopped when the voltage Vfb becomes more than the voltage Vth. This is a summary of the burst mode.

That is, when the load becomes lighter than about 10% of the rated load, the switch element SW10 is turned on/off and the voltage Vfb (feedback voltage) of the FB terminal oscillates in the form illustrated in an upper portion of FIG. 15. In this case, as illustrated in the lower portion of FIG. 15, continuous pulses that are generated in a short on-period (overshoot period) are output intermittently from the OUT terminal, with a cycle of the sum of the on-period and a long off-period (undershoot period). At the time of a heavy load, the pulses are continuously output.

A switching power supply device which performs a switching operation intermittently when the load becomes lighter is suggested by Japanese Patent Application Laid-Open (JP-A) No. 2006-149104. Since the switching power supply device that is disclosed in Japanese Patent Application Laid-Open (JP-A) No. 2006-149104 decreases the noise of a transformer when the mode is switched to low frequency mode or standby mode, the switching power supply device is configured to change a reference voltage which is used to determine switching to the low frequency mode or to the standby mode by the input voltage.

Meanwhile, in the switching power supply device that is disclosed in Japanese Patent Application Laid-Open (JP-A) No. 2008-245419, when the burst threshold voltage Vth increases, the burst power increases and hence the consumption of power decreases. Conversely, when the burst threshold voltage Vth decreases, the burst power decreases and hence the consumption of power increases.

Herein, the burst power will be described. The burst power refers to power that is output to the load at the moment in which the burst mode arrives and the switching operation of the switching element is stopped. A high burst threshold voltage Vth means that the voltage Vfb of the FB terminal is high when the mode has become the burst mode. The voltage Vfb of the FB terminal serves as a reference to determine the off timing of the power MOS transistor Q10 and is compared with a detection signal (voltage of Rs) of the current flowing through the power MOS transistor Q10. Therefore, when the burst threshold voltage Vth is high, that is, the voltage Vfb of the FB terminal is high, the power MOS transistor Q10 is not turned off until a large current flows through the power MOS transistor Q10. For this reason, the burst power increases.

Meanwhile, in the switching power supply device, if a switching rate of the pull-up resistors R101 and R102 becomes high, the burst frequency becomes low and the output ripple becomes high. In contrast, if the switching rate of the pull-up resistors becomes low, the burst frequency becomes high and the output ripple becomes low.

If A=R101 and B=R101·R102/(R101+R102) are set, the switching rate (change rate) of the pull-up resistors is defined as follows.

$$\text{Switching rate}=(A-B)/B=R101/R102 \quad (3)$$

The burst frequency is a vibration frequency of the voltage Vfb of the FB terminal in the burst mode. Therefore, the burst frequency does not mean a switching frequency during the burst mode.

In the switching power supply device, when the switching power supply device operates in the burst mode, because the burst frequency is generally in a range of 200 Hz to 2 kHz which is a frequency range in the audible zone, an abnormal noise by a magnetostrictive sound from the transformer T10 will cause a problem.

The burst power and the burst frequency determine whether it is easy to hear an abnormal noise. That is, it is easy to hear the abnormal noise when the burst power is large at the same burst frequency and it is easy to hear the abnormal noise when the burst frequency is high in the same burst power.

Meanwhile, a charging current of the transformer T10 that is detected by the resistor Rs increases when the voltage input to the transformer T10 increases, with respect to the same feedback voltage Vfb, because of the delay (about 200 ns) by a drive path and the delay (about 100 ns to 500 ns) by a current detection path. Thereby, the output power increases. Therefore, when the input voltage increases, the burst power increases.

Since gain of a power control loop increases when the input voltage increases, the burst frequency becomes high and the output ripple decreases.

The following Table 1 illustrates collection of the above operations.

TABLE 1

| Input voltage (Vi) | high | low |
|---|---|---|
| Output ripple | low | high |
| Burst power → abnormal noise | large → large | small → small |
| Burst frequency | high (easy to hear) | low |
| Burst threshold voltage | high | low |
| Consumption power | low | high |
| Burst power → abnormal noise | large → large | small → small |
| Switching rate (change rate) of pull-up resistors | high | low |
| Output ripple | high | low |
| Burst frequency | low | high (easy to hear) |

Therefore, if the input voltage is set to Vi, the burst power is set to Pburst, the burst frequency is set to Fburst, the output ripple is set to Vo-rip, standby power is set to Psdy, and an abnormal noise level is set to Paud, a mutual relation thereof is represented as illustrated in FIG. 16.

That is, when the input voltage is high, because the burst power Pburst is large and the burst frequency Fburst is high, the abnormal noise level Paud becomes high. Meanwhile, when the input voltage is low, because the burst power Pburst is small, the consumption power (for example, standby power Psdy) increases and the output ripple Vo_rip also increases.

For this reason, in the switching power supply device, it is difficult to realize low consumption of power, a low abnormal noise, and a low output ripple over an entire input voltage range at the time of the burst operation.

In addition, in the switching power supply device that is described in JP-A No. 2006-149104, it is difficult to realize low consumption of power, a low abnormal noise, and a low output ripple over an entire input voltage range, due to the structure thereof.

SUMMARY OF THE INVENTION

The present invention has been made in view of the above circumstances and it is an object of the present invention to provide a switching power supply device that can realize low consumption of power, a low abnormal noise, and a low output ripple over an entire input voltage range.

In order to resolve the above problems, the present invention provides a switching power supply device that includes a feedback terminal to which a feedback signal according to a load state is input and a comparator which compares the terminal voltage of the feedback terminal with a reference voltage and determines whether the load state is a normal load state or a light load state and causes a switching element continuously to execute a switching operation during the normal load state and stops the switching operation of the switching element during the light load state. The switching power supply device includes an input voltage detecting circuit which detects whether an input voltage is high or low, a pull-up resistor which is connected to the feedback terminal, a first switch element which switches a resistance value of the pull-up resistor according to the change of the load state, and a second switch element which switches the resistance value of the pull-up resistor according to whether the input voltage is high or low.

The switching power supply device may further include a switching circuit which switches the value of the reference voltage according to the magnitude of the input voltage.

The first switch element may be turned on/off according to an output of the comparator.

The pull-up resistor may include a first pull-up resistor and a second pull-up resistor which are connected in parallel through the first switch element.

According to the present invention, burst power, a burst frequency, and an output ripple can be designed with a high balance over an entire input voltage range, at the time of a burst operation. Therefore, a switching power supply device that has low consumption power, a low abnormal noise, and a low output ripple can be realized.

BRIEF DESCRIPTION OF THE DRAWINGS

FIG. 7 is a table illustrating a condition of the switching on/off width of each operation mode, the number of bottoms that is counted within a period from the start of resonance to the turning-on of the a switching element, and a load area.

DETAILED DESCRIPTION OF THE PREFERRED EMBODIMENTS

Figure 1:
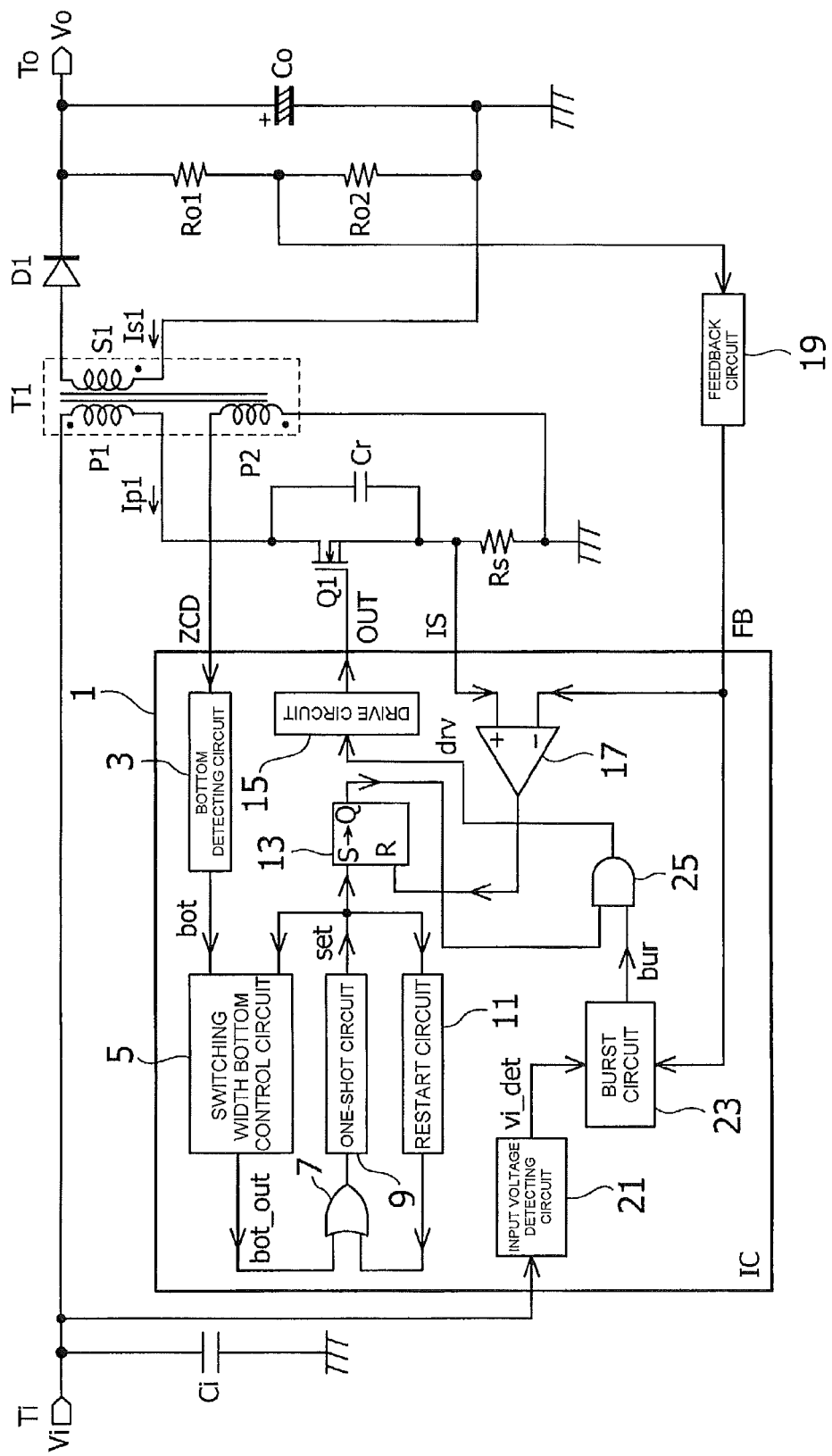
FIG. 1 is a circuit diagram illustrating a switching power supply device according to an embodiment of the present invention.

FIG. 1 is a circuit diagram illustrating a switching power supply device according to an embodiment of the present invention that has the configuration as a pseudo resonance converter.

In the switching power supply device, a transformer T1 includes a primary winding P1, a secondary winding S1, and an auxiliary winding P2. One end of the primary winding P1 is connected to an input terminal Ti and the other end thereof is connected to a drain of a MOSFET which is a switching element Q1. One end of the secondary winding S1 is connected to an output terminal To through a diode D1 and the other end thereof is connected to a ground point. One end of the auxiliary winding P2 is connected to a ZCD terminal to be an input terminal for zero current detection in a switching control circuit 1, to be described below, and the other end thereof is connected to a ground point.

A smoothing capacitor Ci is connected between the input terminal Ti and the ground point, a smoothing capacitor Co is connected between the output terminal To and the ground point, and a resonance capacitor Cr is connected between the drain of the switching element Q1 and the ground point. A voltage dividing circuit that includes resistors Ro1 and Ro2 is connected between the output terminal To and the ground point and a resistor Rs is connected between a source of the switching element Q1 and the ground point.

The switching control circuit 1 includes; a bottom detecting circuit 3, a switching width bottom control circuit 5, an OR circuit 7, an one-shot circuit 9, a restart circuit 11, a flip-flop 13, a drive circuit 15, a comparator 17, an input voltage detecting circuit 21, a burst circuit 23, and an AND circuit 25. The switching control circuit 1 is integrated.

If the bottom detecting circuit 3 detects a bottom state on the basis of an output voltage of the auxiliary winding P2 applied to the ZCD terminal, the bottom detecting circuit 3 generates a bot signal and outputs the bot signal to the switching width bottom control circuit 5.

Figure 2:
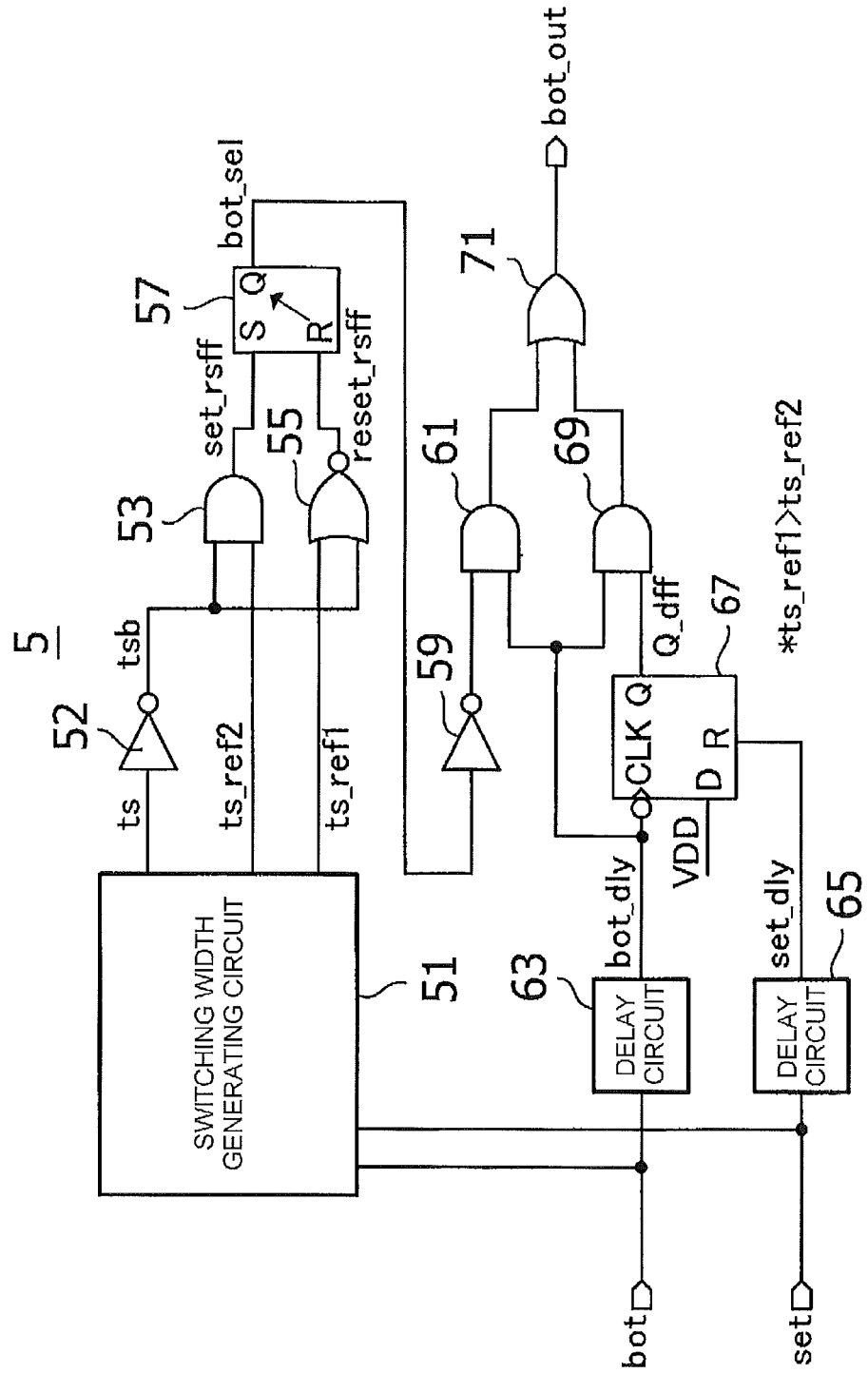
FIG. 2 is a circuit diagram illustrating a configuration example of a switching width bottom control circuit.

The switching width bottom control circuit has the configuration illustrated in FIG. 2. A switching width generating circuit 51 that is provided in the switching width bottom control circuit 5 has the configuration illustrated in FIG. 3.

Figure 3:
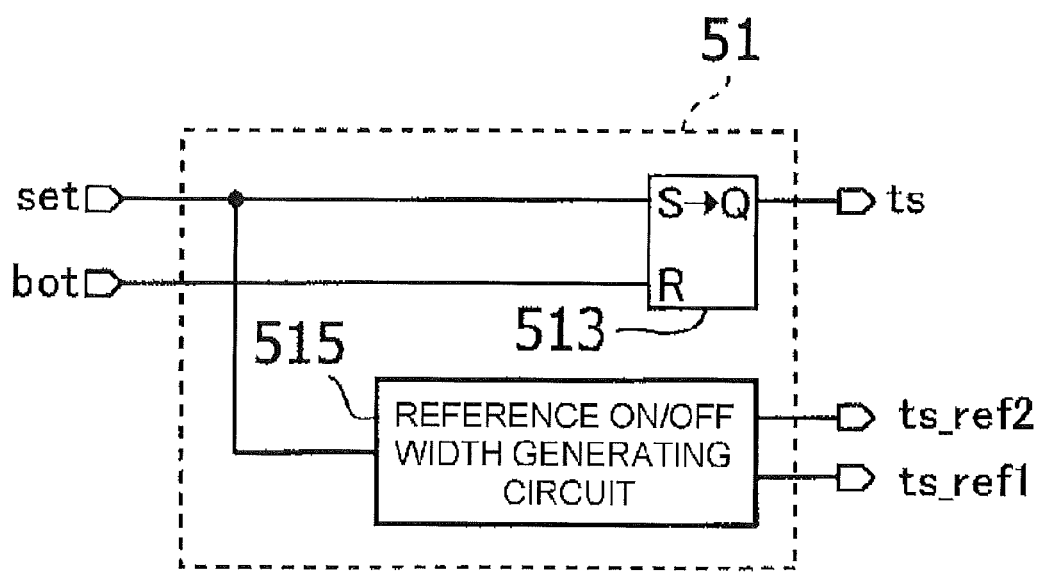
FIG. 3 is a block diagram illustrating a configuration example of a switching width generating circuit.

In FIG. 3, a flip-flop 513 inputs a set signal and the bot signal to a set terminal and a reset terminal, respectively, and outputs a ts signal from a Q output terminal. A reference on/off width generating circuit 515 generates a ts_ref1 signal and a ts_ref2 signal having the predetermined time width that is synchronized with the set signal. As described below, the ts_ref1 signal and the ts_ref2 signal are used as a comparison reference with respect to the time width of the ts signal.

The input voltage detecting circuit 21 determines whether the input voltage Vi is high or low and outputs an input voltage detection signal vi_det that indicates the determination result. That is, the input voltage detecting circuit 21 compares the input voltage Vi and a predetermined threshold voltage Vi_th, and changes a level of the input voltage detection signal vi_det from an L level to an H level when the input voltage Vi changes from a low voltage state in which the input voltage Vi is less than the threshold voltage Vi_th to a high voltage state in which the input voltage Vi is more than or equal to the threshold voltage Vi_th and changes the level of the input voltage detection signal vi_det from the H level to the L level when the input voltage Vi changes from the high voltage state to the low voltage state. In the input voltage detecting circuit 21, the threshold voltage Vi_th may have to be in a state of hysteresis to accurately detect a state of the input voltage Vi.

Figure 4:
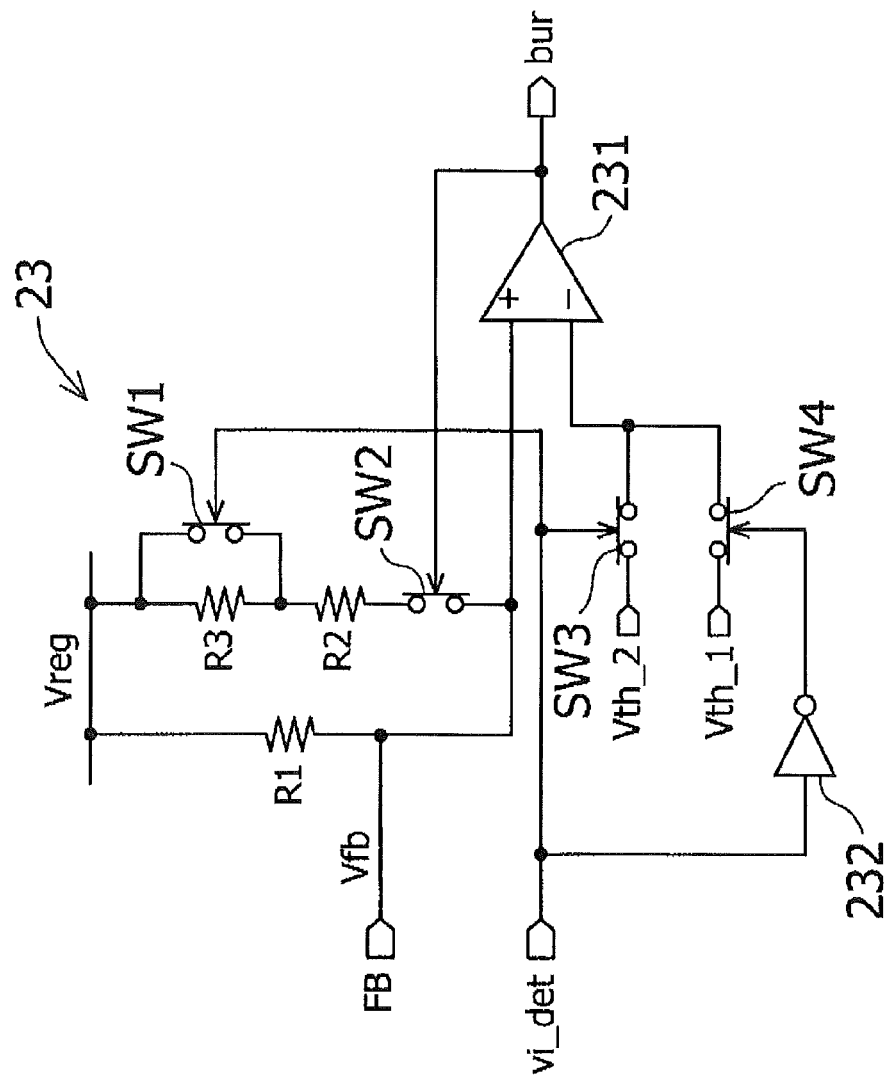
FIG. 4 is a circuit diagram illustrating a configuration example of a burst circuit.

In the configuration example illustrated in FIG. 4, the burst circuit 23 includes; pull-up resistors R1 to R3, switch elements SW1 to SW4, a comparator 231, and an inverter 232.

The pull-up resistor R1 is connected between the FB terminal and a Vreg power supply terminal where the output voltage Vreg of a regulator (not illustrated in the drawings) is applied. The pull-up resistors R2 and R3 and the switch element SW2 are connected in series between the Vreg power supply terminal and the FB terminal. The switch element SW1 is connected in parallel to the pull-up resistor R3.

The positive-side input terminal of the comparator 231 is connected to the FB terminal and an output terminal thereof is connected to a bur terminal and a control terminal of the switch element SW2. The negative-side input terminal of the comparator 231 is connected to a Vth_2 terminal through the switch element SW3 and is connected to a Vth_1 terminal through the switch element SW4. The vi_det terminal is connected to the control terminal of the switch element SW1 and the control terminal of the switch element SW3 and is connected to the control terminal of the switch element SW4 through the inverter 232.

The burst threshold voltages Vth_1 and Vth_2 (Vth_1>Vth_2) are applied to the Vth_1 terminal and the Vth_2 terminal, respectively, and the input voltage detection signal vi_det is input from the input voltage detecting circuit 21 (refer to FIG. 1) to the vi_det terminal.

In the burst circuit 23, if the level of the input voltage detection signal vi_det becomes the L level, the switch elements SW1 and SW3 are turned off and the switch element SW4 is turned on through the inverter 232. In this situation, the switching rate (refer to Equation 3 described above) of the pull-up resistors becomes R1/(R2+R3) and the burst threshold voltage Vth_1 is selected.

Meanwhile, if the level of the input voltage detection signal vi_det becomes the H level, the switch elements SW1 and SW3 are turned on and the switch element SW4 is turned off. In this situation, the switching rate of the pull-up resistors becomes R1/R2 and the burst threshold voltage Vth_2 is selected.

As illustrated in FIG. 1, an output terminal of the burst circuit is connected to one input terminal of the AND circuit 25. The other input terminal of the AND circuit 25 is connected to the Q output terminal of the flip-flop 13. One of the output terminals of the AND circuit 25 is connected to an input terminal of the drive circuit 15.

Figure 5:
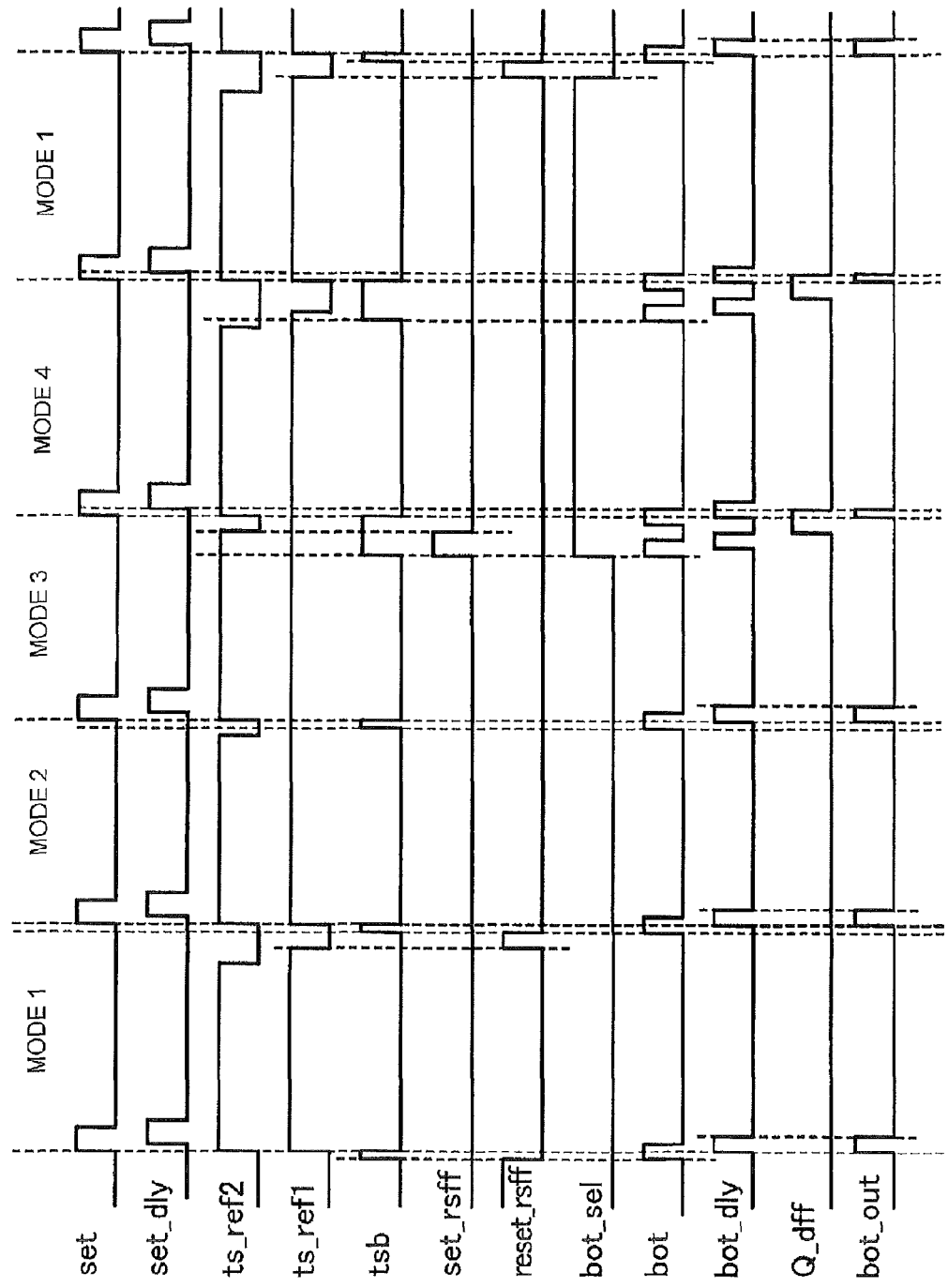
FIG. 5 is a timing chart illustrating an operation of the switching power supply device of FIG. 1.

Hereinafter, the operation of the switching power supply device according to this embodiment will be described with reference to the time chart shown in FIG. 5.

In FIG. 1, a bot_out signal from the switching width bottom control circuit 5 or a restart signal from the restart circuit 11 is output from the OR circuit 7. The one-shot circuit 9 is triggered by a front edge (the beginning) of any one of the above signals and forms a set signal which is a pulse signal having a pulse width of 300 ns, for example. The flip-flop 13 that gives priority to set is determined by the set signal. As a result, a level of the Q output terminal of the flip-flop 13 becomes the H level.

In a normal operation mode that is a normal load state, since a voltage Vfb of the FB terminal is Vfb≥Vth (Vth_1 or Vth_2), the level of an output of the burst circuit 23 becomes the H level. Therefore, in this case, a drive signal is input from the AND circuit 25 to the drive circuit 15 and the switching element Q1 is turned on. As a result, the primary winding P1 of the transformer T1 that is an inductor starts to accumulate energy.

At this time, the voltage of both ends of the resistor Rs that is connected in series to the switching element Q1, that is, a voltage that corresponds to a current flowing through the switching element Q1 is input to one input terminal of the comparator 17 through the IS terminal and an output voltage of the voltage dividing circuit that includes the resistors Ro1 and Ro2, that is, a divided voltage of the voltage V0 of the output terminal To is input to a feedback circuit 19.

Figure 13:
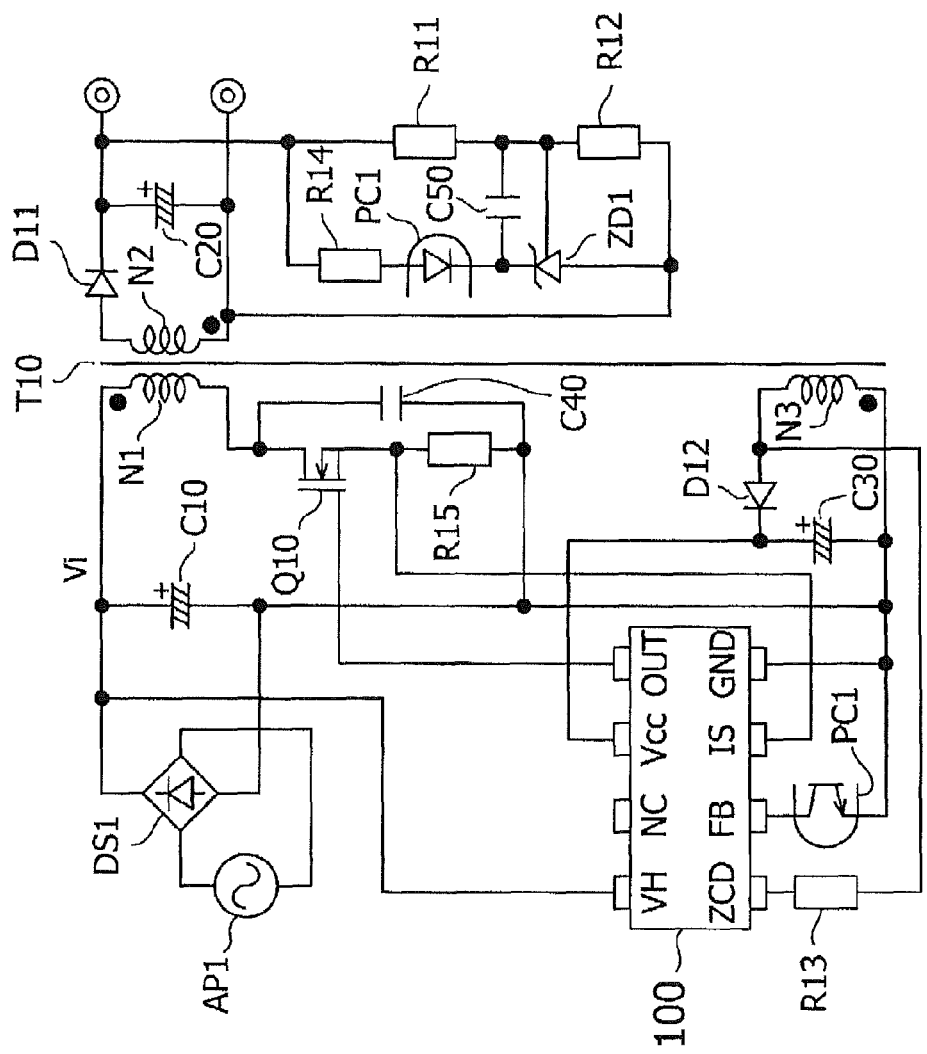
FIG. 13 is a circuit diagram illustrating a conventional example of the switching power supply device.

The feedback circuit 19 amplifies the difference between the divided voltage of the voltage V0 and a reference voltage (not illustrated in the drawings) and generates a feedback signal corresponding to an error signal, and the feedback signal is input to one input terminal of the comparator 17 through the FB terminal. In this case, the resistors Ro1 and Ro2 correspond to the resistors R11 and R12 of FIG. 13. The feedback circuit 19 has the same configuration as that of the circuit that includes the resistor R14, the capacitor C50, the shunt regulator ZD1, and the photo coupler PC1 of FIG. 13.

In addition, if the voltage of both ends of the resistor Rs becomes more than a voltage value of the feedback signal output from the feedback circuit 19, the flip-flop 13 is reset by a reset signal output from the comparator 17. If the flip-flop 13 is reset, because a dry signal becomes off (a level thereof becomes the L level) and the switching element Q1 is turned off, the energy that is accumulated in the primary winding P1 of the transformer T1 is discharged to the side of the secondary winding S1. In a discharge period of the energy, a constant voltage is applied to the switching element Q1. If the discharge of the energy accumulated in the primary winding P1 ends, the resonance circuit that is configured using the resonance capacitor Cr and the primary winding P1 of the transformer T1 starts a resonance operation.

The auxiliary winding P2 of the transformer T1 generates a voltage that corresponds to a resonance voltage of the resonance circuit and applies the voltage to the ZCD terminal. The bottom detecting circuit 3 includes a comparator (not illustrated in the drawings) that compares the voltage applied to the ZCD terminal with the reference voltage close to 0 V. When the applied voltage becomes the reference voltage or less, the bottom detecting circuit 3 determines that the applied voltage shows a first bottom and outputs a first pulse signal (bot signal) having the pulse width of 200 ns to the switching width minimum control circuit 5.

The switching width bottom control circuit 5 determines whether a bot_out signal is output on the basis of the first bot signal or on the basis of the following bot signals. This is to increase a switching cycle at the time of the light load, because the switching frequency of when continuous switching is performed becomes higher as the load becomes light and conversion efficiency in the light load is deteriorated, in the pseudo resonance converter.

That is, the switching width generating circuit 51 which is used as the switching width generating circuit of the switching width bottom control circuit 5 and is illustrated in FIG. 3 outputs the output signal of the flip-flop 513 as the ts signal and the reference on/off width generating circuit 515 generates the ts_ref1 signal and the ts_ref2 signal which are synchronized with the set signal.

A period where the level of the ts signal is the H level (period where a level of a tsb signal to be described below is the L level) shows the on/off width (sum of the on width and the off width; refer to FIG. 8) ts of the switching element Q1. In addition, the on/off width ts of the switching element Q1 indicates the magnitude of the load and the on/off width ts increases as the load becomes heavy (as the output power increases). This is because the voltage Vfb of the FB terminal increases as the load becomes heavy and time needed until the voltage of the IS terminal corresponding to the current flowing through the primary winding P1 of the transformer T1 becomes the voltage Vfb increases. That is, as the load becomes heavy, the time where the energy is accumulated in the transformer T1 and time where the energy is discharged to the secondary side increase.

The ts_ref1 signal and the ts_ref2 signal are used as a comparison reference of the on/off width ts and are used to determine the magnitude of the load. That is, in this embodiment, operation modes 1 to 4 are selected on the basis of the comparison result of the reference values ts_ref1 and ts_ref2 of the on/off widths given by the ts_ref1 signal and the ts_ref2 signal and the on/off widths ts indicating the magnitude (Po of FIG. 6) of the load. The reference value ts_ref1 is set to be more than the reference value ts_ref2.

In FIG. 2, the ts signal is inverted by the inverter 52. The tsb signal that is output from the inverter 52 is input to one input terminal of each of an AND circuit 53 and a NOR circuit 55. The ts_ref2 signal is input to one input terminal of the AND circuit 53 and the ts_ref1 signal is input to the other input terminal of the NOR circuit 55, respectively.

Figure 6:
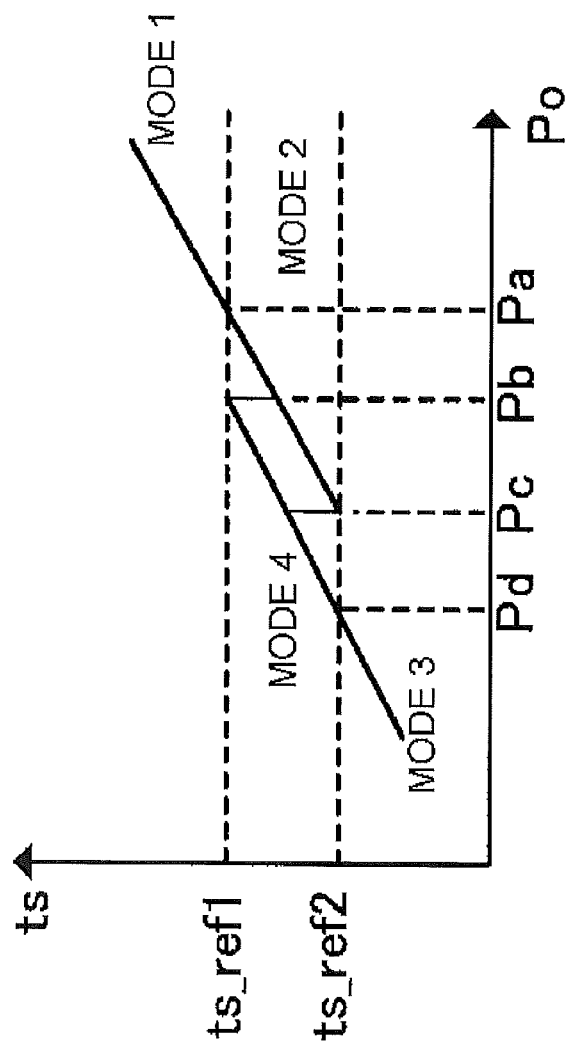
FIG. 6 is a graph illustrating a relation of reference values to the switching widths, operation modes, and the magnitude of a load.

FIG. 6 is a graph illustrating the relation of the reference values ts_ref1 and ts_ref2 of the switching widths, the operation modes, and the magnitude of the load Po. As illustrated in FIGS. 5 and 6, the operation mode 1 is used when the relation of ts>ts_ref1 is realized, that is, the relation of the loads of Po>Pa is realized. In this case, since a reset_rsff signal is output from the NOR circuit 55 and is applied to the reset terminal of the RS flip-flop 57 giving priority to the reset, the RS flip-flop 57 giving priority to the reset is reset.

The magnitudes Pa, Pb, Pc, and Pd of the loads illustrated in FIG. 6 are set to 60%, 50%, 40%, and 30% of the magnitude of the rated load, respectively.

The operation mode 2 is used when the flip-flop 57 is reset and the relation of ts<ts_ref1 and ts>ts_ref2 is realized, that is, the relation of the loads of Pa>Po>Pc is realized. In this case, the AND circuit 53 and the NOR circuit 55 do not output a signal. That is, each output terminal is in a state of the L level.

The operation mode 3 is used when the relation of ts<ts_ref2 is realized, that is, the relation of the loads of Po<Pd is realized. In this case, the set_rsff signal is output from the AND circuit 53 illustrated in FIG. 2 and is applied to the set terminal of the flip-flop 57.

The operation mode 4 is used when the flip-flop 57 is set and relations of ts<ts_ref1 and ts>ts_ref2 are realized, that is, the relation of the loads of Pb>Po>Pd is realized. In this case, the output terminals of the AND circuit 53 and the NOR circuit 55 are in a state of the L level.

FIG. 7 is a table illustrating a collection of the above operations. FIG. 7 illustrates the condition of the switching on/off widths corresponding to the individual operation modes, the number of bottoms until the switching element Q1 is turned on after resonance starts, and load areas. As the result of the above operations, the level of a bot_sel signal that is output from the flip-flop 57 becomes the H signal in the period illustrated in FIG. 5. The bot_sel signal is a signal to select the number of bottoms of the voltage (corresponding to a drain voltage of the switching element Q1 at the time of the resonance) output from the auxiliary winding P2 of the transformer T1. The number of bottoms of 1 is selected when the level of the signal is the L level and the number of bottoms of 2 is selected when the level of the signal is the H level.

The bot_sel signal is input to one input terminal of the AND circuit 61 through the inverter 59.

Meanwhile, in the switching width bottom control circuit 5, the bot signal is input to a delay circuit 63 and the set signal is input to a delay circuit 65. In this embodiment, the delay times of the delay circuits 63 and 65 are set to 100 ns (½ of the pulse width of the bot signal).

Bot_dly signals that are output from the delay circuit 63 are input to one input terminal of the AND circuit 61, a clock terminal CLK of the D flip-flop 67, and one input terminal of the AND circuit 69, respectively. A set_dly signal that is output from the delay circuit 65 is input to the reset terminal R of the D flip-flop 67.

The output terminals of the AND circuit 61 and the AND circuit 69 are connected to the first and second input terminals of the OR circuit 71, respectively. The bot_out signal is output from the OR circuit 71.

Therefore, when the level of the bot_sel signal is the L level (indicating the normal load) and a level of the bot_dly signal is the H level, a level of the bot_out signal becomes the H level. Since the bot_out signal is input to the one-shot circuit 9 through the OR circuit 7 illustrated in FIG. 1, the one-shot circuit 9 is triggered to output the set signal. Thereby, since the flip-flop 13 is set and a level of the dry signal becomes the H level, the switching element Q1 is turned on.

Figure 8:
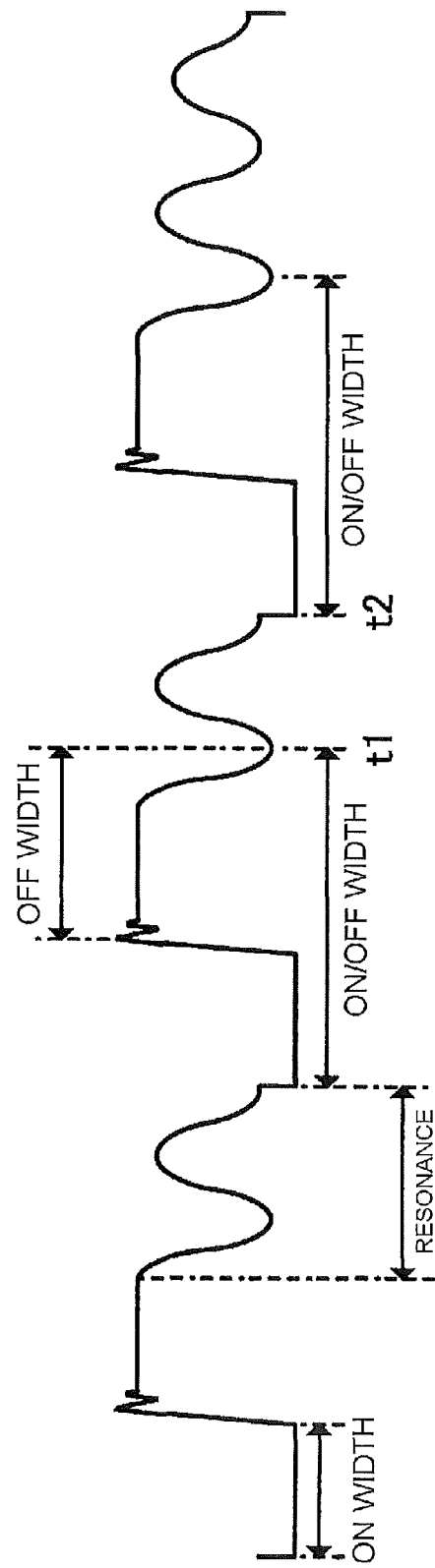
FIG. 8 is a waveform diagram illustrating a change form of a drain voltage of the switching element.

In FIG. 8 which illustrates the change in the drain voltage of the switching element Q1, t1 indicates a point of time when a first bottom of the drain voltage of the switching element Q1 is generated during the resonance. When the level of the bot_sel signal is the L level, at the point of time t1, the level of the dry signal becomes the H level and the switching element Q1 is turned on.

The flip-flop 13 is reset by the reset signal from the comparator 17 illustrated in FIG. 1. According to the reset, the switching element Q1 is turned off.

Meanwhile, when the level of the bot_sel signal is the H level (indicating the light load), a level of the output terminal of the AND circuit 61 is fixed to the L level. If the D flip-flop 67 reads a voltage VDD (which is a power supply voltage of the switching control circuit 1 and of which a level indicates the H level) input to a data input terminal D thereof by a rear edge (falling edge) of the first bot_dly signal, a Q_dff signal of the H level is output from the D flip-flop 67 and is applied to the other input terminal of the AND circuit 69. Therefore, if the second bot_dly signal is input to one input terminal of the AND circuit 69, the level of the output terminal of the AND circuit 69 becomes the H level. Accordingly, the level of the bot_out signal also becomes the H level.

If the level of the bot_out signal changes to the H level, the one-shot circuit 9 illustrated in FIG. 1 is triggered and outputs the set signal. Therefore, the flip-flop 13 is set and the switching element Q1 is turned on. In this way, the switching element Q1 is turned on at the point of time t2 (the point of time when the resonance voltage shows the second bottom) in FIG. 8. As such, bottom skip control is performed at the time of the light load.

The D flip-flop 67 is reset by a front edge (rising edge) of the set_dly signal based on the set signal. According to the reset, the levels of the Q_dff signal and the bot_out signal change from the H level to the L level.

When a next set signal is not generated in the predetermined time (for example, 30 μs) after the set signal input to the restart circuit 11 is output, the restart circuit 11 illustrated in FIG. 1 outputs a restart signal and triggers the one-shot circuit 9.

According to this embodiment, since appropriate bottom skip control can be realized by detecting a load state with high precision at the primary side, conversion efficiency during a continuous switching operation can be improved.

Next, the burst circuit 23 illustrated in FIG. 4 will be described.

In the normal operation mode other than an ultra-light load state (when the load is lighter than the rated load about 10%), since the voltage Vfb of the FB terminal is Vfb Vth (Vth_1 or Vth_2), the level of the output bur of the burst circuit 23 becomes the H level. In this case, as described above, the switching element Q1 performs the continuous switching operation and the switch element SW2 is turned on.

In the light load mode (in this case, the "light load" is different from the light load identified by the bot_sel signal=H level) that is the ultra-light load state, the voltage Vfb of the FB terminal is Vfb<Vth<(Vth_1, Vth_2). In this case, since the level of the output bur of the burst circuit 23 becomes the L level, the switching element Q1 stops the switching operation and the switch element SW2 is turned off.

Figure 14:
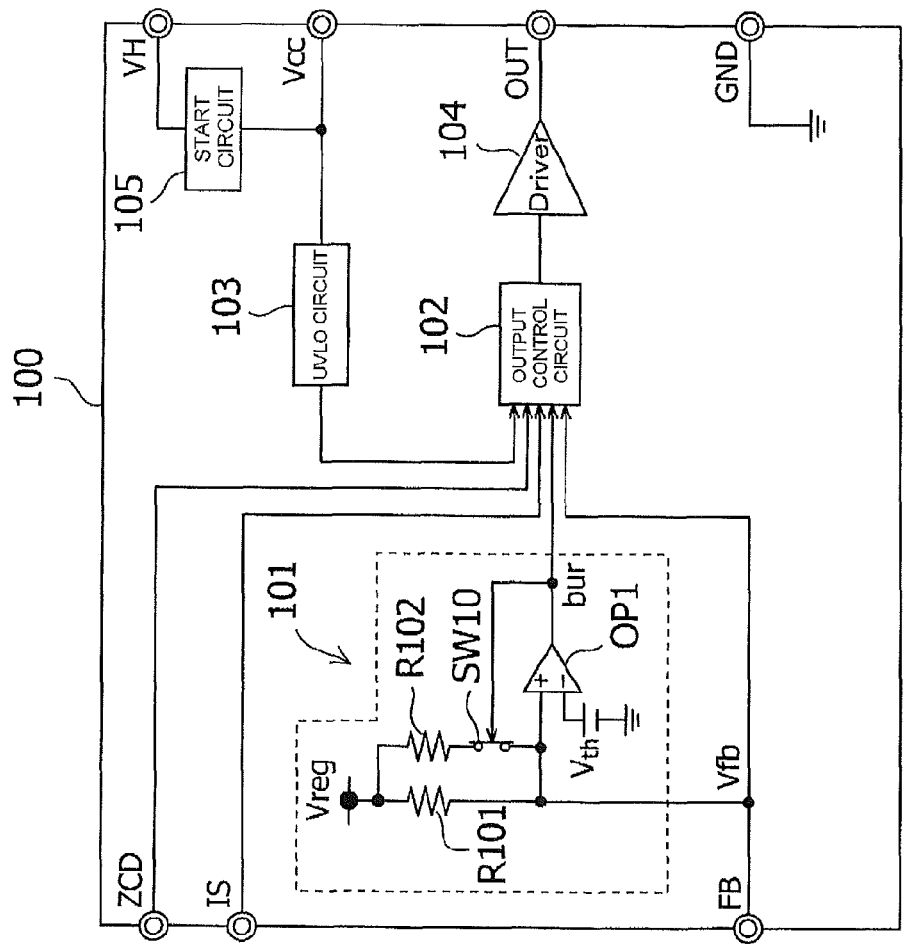
FIG. 14 is a circuit diagram illustrating the configuration of a power supply control IC.
Figure 15:
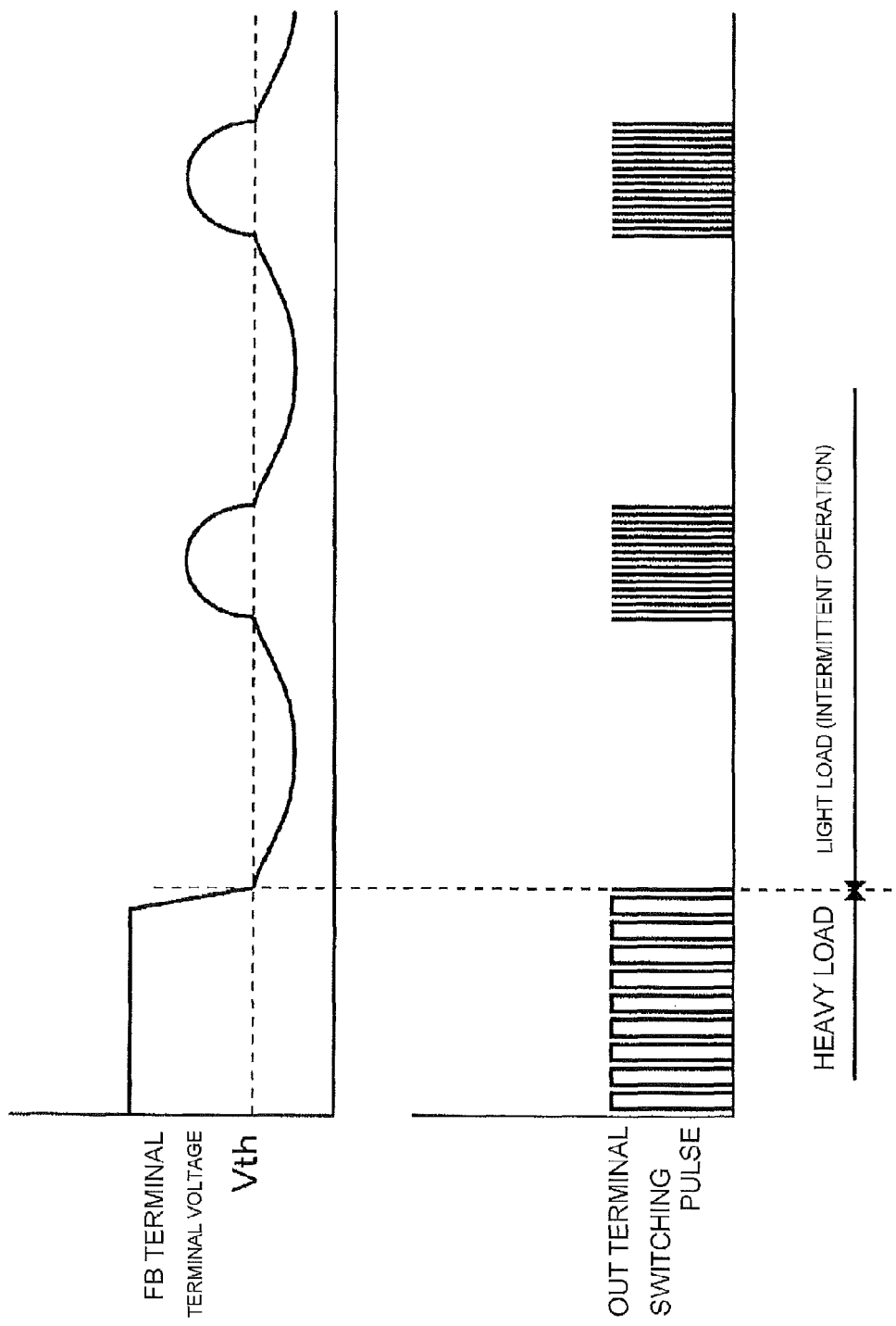
FIG. 15 is a timing chart illustrating an operation of the switching power supply device of FIG. 13.
Figure 16:
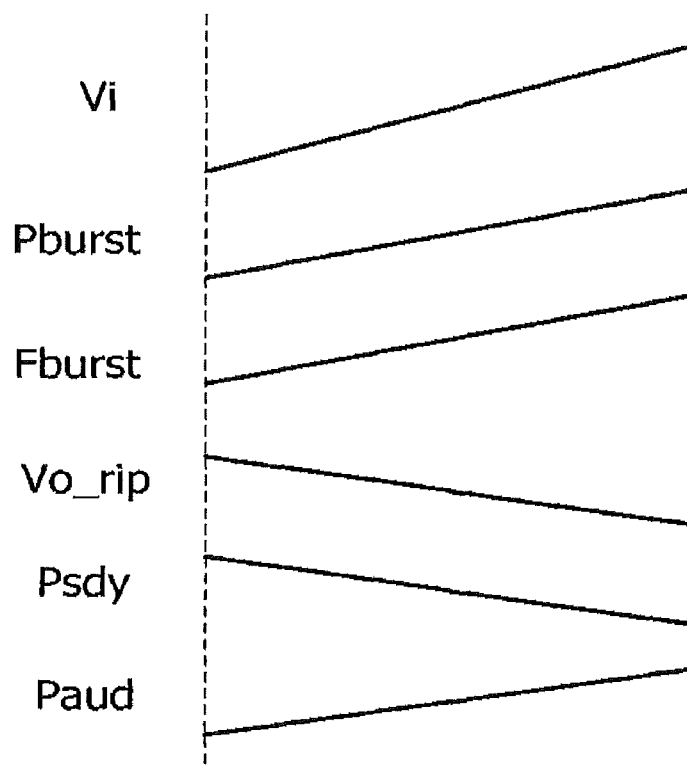
FIG. 16 is a diagram illustrating a relation of a voltage input to a transformer, burst power, a burst frequency, an output ripple, standby power, and an abnormal noise level in the switching power supply device of FIG. 13.

As a result, the pull-up current (that is, the pull-up resistance and the pull-up current of the photo transistor constituting the photo coupler PC1) of the FB terminal is switched around the detection level of the light load. By the switching, overshoot or undershoot is generated in the voltage Vfb of the FB terminal. The operation described until now is the same as that of the burst circuit 101 illustrated in FIG. 14.

Figure 9:
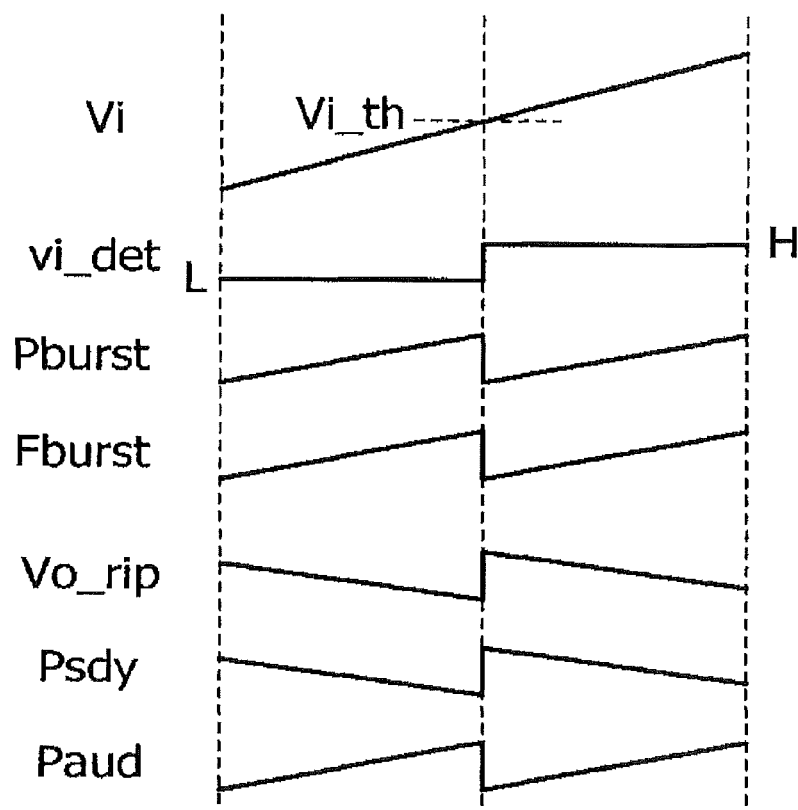
FIG. 9 is a diagram illustrating a relation of an input voltage, burst power, a burst frequency, an output ripple, standby power, and an abnormal noise level in the switching power supply device of FIG. 1.

However, in the burst circuit 23, as illustrated in FIG. 9, if the input voltage Vi changes from a high voltage state in which the input voltage Vi is equal to or more than the threshold voltage Vi_th to a low voltage state in which the input voltage Vi is less than the threshold voltage Vi_th, that is, the level of the input voltage detection signal vi_det changes from the H level to the L level, the burst threshold voltage becomes Vth_1 and a switching rate (change rate) of the pull-up resistance becomes R1/(R2+R3). In contrast, if the input voltage Vi changes from the low voltage state in which the input voltage Vi is less than the threshold voltage Vi_th to the high voltage state in which the input voltage Vi is equal to or more than the threshold voltage Vi_th, that is, the level of the input voltage detection signal vi_det changes from the L level to the H level, the burst threshold voltage becomes Vth_2 (<Vth_1) and the switching rate of the pull-up resistances becomes R1/R2. That is, the relation of the following Table 2 is obtained.

TABLE 2

| Input voltage (Vi) | high | low |
|---|---|---|
| Burst threshold voltage | low (Vth_2) | high (Vth_1) |
| Added resistances | R2 | R2 + R3 |
| Switching rate (change rate) of pull-up resistances | high | low |

Therefore, according to the switching power supply device according to this embodiment that includes; the burst circuit 23, the burst power Pburst, the burst frequency Fburst, the output ripple Vo_rip, the standby power Psdy, and the abnormal noise level Paud are changed as illustrated in FIG. 9, according to whether the input voltage Vi is high or low.

That is, when the input voltage becomes high, the switching power supply device according to this embodiment switches the level of the burst threshold voltage into a lower level (Vth_2) and suppresses the burst power, it also switches the switching rate of the pull-up resistances into a higher value R1/R2 and suppresses the burst frequency. Therefore, optimal design can be made in an entire input voltage range. As a result, low consumption power, a low abnormal noise, and a low output ripple can be achieved.

In this embodiment, the input voltage Vi is divided into two categories of high and low. However, the input voltage Vi may be divided into three categories or more and the burst threshold voltage and the switching rate of the pull-up resistances according to each category may be selected.

In addition, switching of the burst threshold voltage may be omitted depending on a situation. In this case, low consumption power, a low abnormal noise, and a low output ripple can be achieved.

In the embodiment described above, the two load determination reference values ts_ref1 and ts_ref2 are used. However, in the graph of FIG. 10 that illustrates the relation of the reference values of the switching widths and the number of bottoms, three load determination reference values ts_ref1, ts_ref2, and ts_ref3 (ts_ref1>ts_ref2>ts_ref3) may be used.

Figure 11:
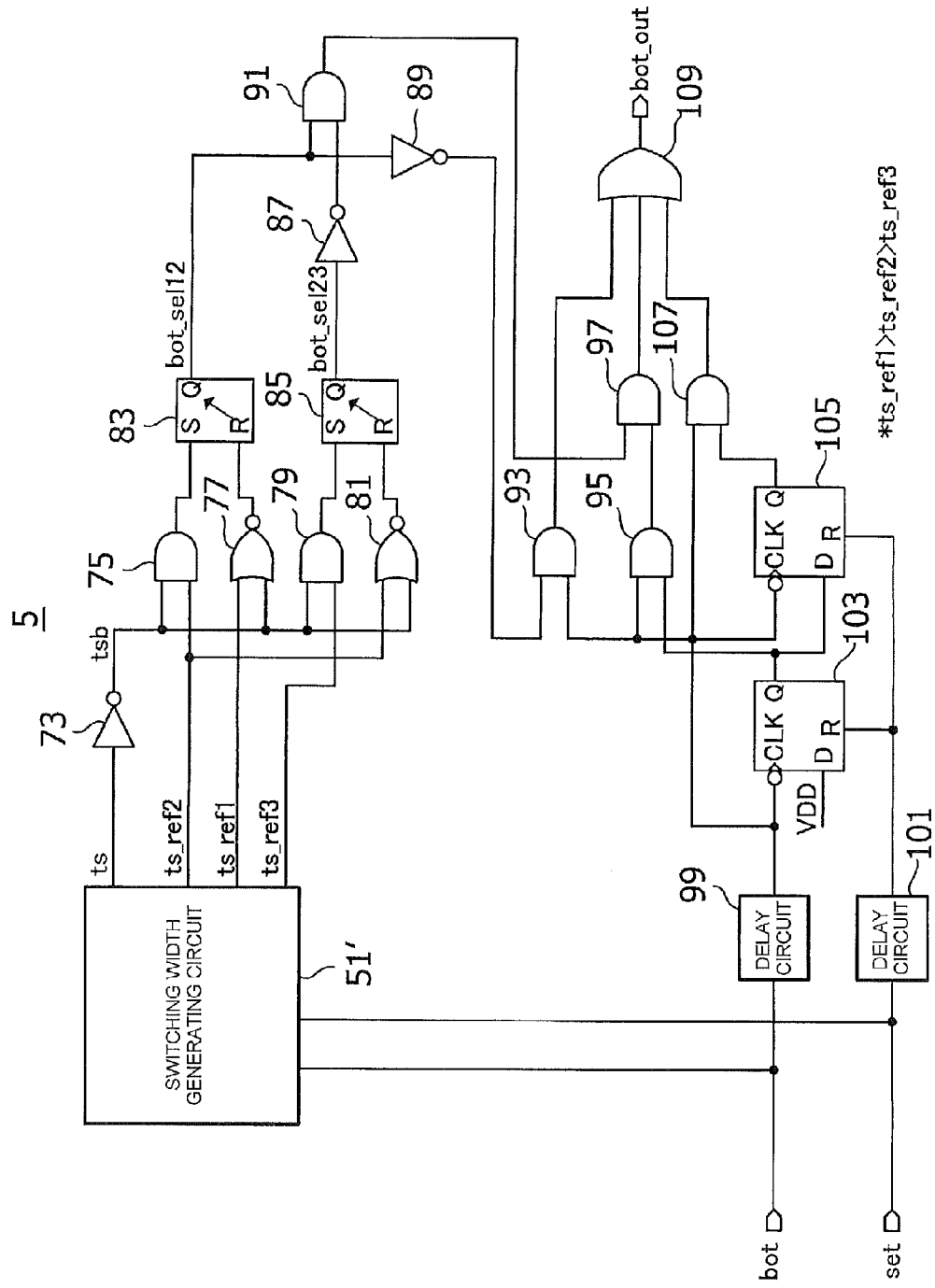
FIG. 11 is a circuit diagram illustrating another configuration example of the switching width bottom control circuit.

FIG. 11 illustrates an exemplary configuration of the switching width bottom control circuit in the case where the load determination reference values ts_ref1 to ts_ref3 are used. The switching width bottom control circuit 5 has the configuration based on the switching width bottom control circuit 5 illustrated in FIG. 2.

That is, a switching width generating circuit 51' outputs the ts signal and the ts_ref1 to ts_ref3 signals. The ts signal is inverted by the inverter 73. In addition, the tsb signal that is output from the inverter 73 is input to one input terminal of each of the AND circuit 75, the NOR circuit 77, the AND circuit 79, and the NOR circuit 81. The ts_ref1 signal is input to the other input terminal of the NOR circuit 77, the ts_ref2 signal is input to the other input terminals of the AND circuit 75 and the NOR circuit 81, and the ts_ref3 signal is input to the other input terminal of the AND circuit 79.

The output terminal of the AND circuit 75 and the output terminal of the NOR circuit 77 are connected to the set terminal and the reset terminal of the flip-flop 83, respectively, and the output terminal of the AND circuit 79 and the output terminal of the NOR circuit 81 are connected to the set terminal and the reset terminal of the flip-flop 85, respectively. As a result, a bot_sel12 signal that defines a transition from the bottom 1 of FIG. 10 ("i" of the bottom i in FIG. 10 means the number of bottoms i) to the bottom 2 is output from the flip-flop 83 and a bot_sel23 signal that defines a transition from the bottom 2 of FIG. 10 to the bottom 3 is output from the flip-flop 85.

The bot_sel12 signal is input to one input terminal of the AND circuit 91, is inverted by the inverter 89, and is input to one input terminal of the AND circuit 93. The bot_sel23 signal is inverted by the inverter 87 and is input to the other input terminal of the AND circuit 91. The output terminal of the AND circuit 91 is connected to one input terminal of the AND circuit 97.

Meanwhile, the bot signal delayed by the delay circuit 99, is input to the clock terminals CLK of the D flip-flop 103 and the D flip-flop 105, and is input to the other input terminal of the AND circuit 93, one input terminal of the AND circuit 95, and one input terminal of the AND circuit 107.

The Q output terminal of the D flip-flop 103 is connected to the other input terminal of the AND circuit 95 and the data input terminal D of the D flip-flop 105 and the Q output terminal of the D flip-flop 105 is connected to the other input terminal of the AND circuit 107.

The output terminal of the AND circuit 93, the output terminal of the AND circuit 97, and the output terminal of the AND circuit 107 are connected to the first, second, and third input terminals of the OR circuit 109, respectively.

Since the switching width bottom control circuit 5 performs the operation based on the switching width bottom control circuit 5 illustrated in FIG. 2, the detailed description of the operation will not be repeated. According to the switching width bottom control circuit 5, the transition from the bottom 1 to the bottom 2 is executed when the bot_sel12 signal is output from the flip-flop 83 and the transition from the bottom 2 to the bottom 3 is executed when the bot_sel23 signal is output from the flip-flop 85. When the signals are not output from the flip-flops 83 and 85, the transitions are not executed, or the transition from the bottom 3 to the bottom 2 or the transition from the bottom 2 to the bottom 1 is executed.

The switching width generating circuit 51' may have a configuration based on the configuration illustrated in FIG. 3.

Figure 10:
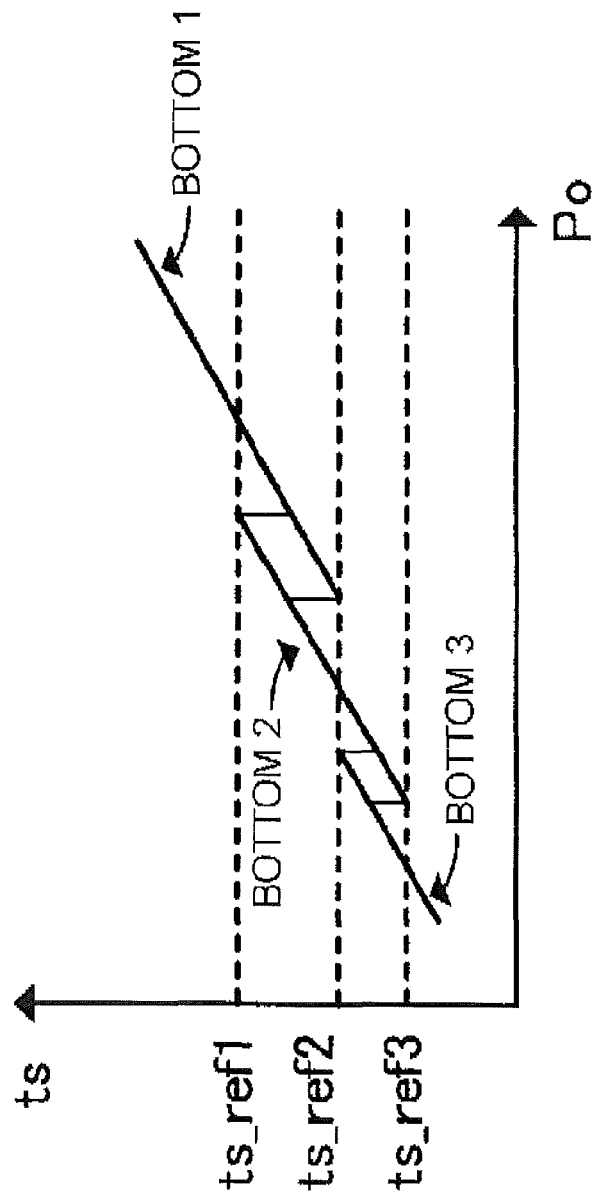
FIG. 10 is a graph illustrating a relation of the reference values of the switching widths and the number of bottoms.
Figure 12:
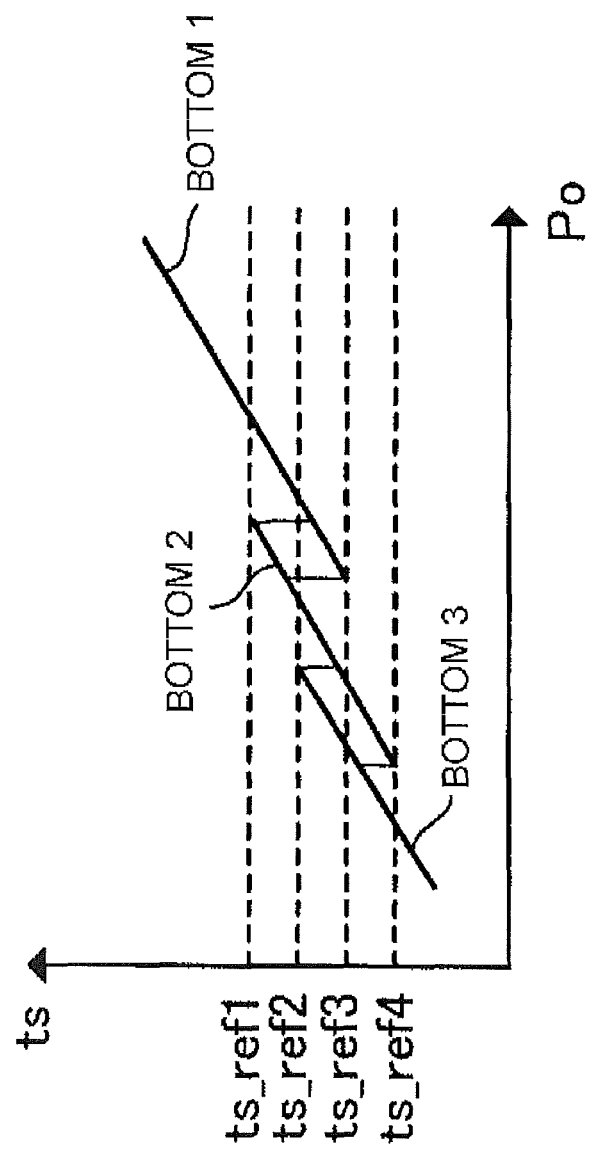
FIG. 12 is a graph illustrating another example of a relation of the reference values of the switching widths and the number of bottoms.

Meanwhile, in the example illustrated in FIG. 10, the reference value ts_ref2 is used commonly for the switching between when the number of bottoms is 1 and when the number of bottoms is 2 and the switching between when the number of bottoms is 2 bottom and when the number of bottoms is 3. However, in the graph of FIG. 12 that illustrates another example of a relation of the reference values of the switching widths and the number of bottoms, the common use can be avoided using the four reference values ts_ref1 to ts_ref4.

When the load becomes light, because the operation frequency can be suppressed from becoming high at the time of the continuous switching operation, the number of bottoms needs to be increased.

In a case where the maximum value of the number of bottoms is an arbitrary number N (N is an integer of 2 or more), the number of reference values may be in the range of N to 2N−2 in consideration of the partial common use. In this case, the number of reference values has the maximum value when the two reference values of the reference value at the time of changing each number of bottoms to the number of bottoms smaller than the original number of bottoms by 1 and the reference value at the time of changing each number of bottoms to the number of bottoms larger than the original number of bottoms by 1 exist independently from the reference values with respect to other number of bottoms. However, since a reference value at the time of changing the number of bottoms of 1 to the number of bottoms of 0 and a reference value at the time of changing the number of bottoms of N to the number of bottoms of (N+1) do not exist, the number of reference values becomes (2N−2). For example, the number of reference values at the time of executing control until the number of bottoms of 4 becomes 4 to 6. In addition, the number of reference values at the time of executing control until the number of bottoms of 5 becomes 5 to 8.

A value in the range of N to (2N−2) that becomes each reference value is determined according to whether each reference value is used only to determine any one of the number of bottoms of the specific two kinds or is used to determine any one of the specific number of bottoms M and (M+1) and determine any one of the specific number of bottoms M and (M−1). The maximum reference value is used only to determine the transition from the bottom 2 to the bottom 1 (determine any one of the number of bottoms of 1 and 2) and the minimum reference value is used only to determine the transition from the bottom (N−1) to the bottom N (determine any one of the number of bottoms of (N−1) and N).

The pseudo resonance converter is described as the embodiment. However, the present invention is not limited thereto and a non-resonance-type converter may be used.

What is claimed is:

1. A switching power supply device comprising:
   a feedback terminal to which a feedback signal based on a load state is input;
   a comparator that compares a terminal voltage of the feedback terminal with a reference voltage and determines whether the load state is a normal load state or a light load state, the switching power supply device causing one or more switching elements to continuously execute a switching during the normal load state and causing the one or more switching elements to stop the switching operation during the light load state;
   an input voltage detecting circuit that detects whether an input voltage is high or low; and
   one or more pull-up resistors that are connected to the feedback terminal;
   the one or more switching elements including a first switch element that switches a resistance value of the one or more pull-up resistors based on the change of the load state; and
   the one or more switching elements including a second switch element that switches the resistance value of the one or more pull-up resistors based on whether the input voltage is high or low.

2. The switching power supply device according to claim 1, further comprising a switching circuit that switches a value of the reference voltage based on the detection result of the input voltage detecting circuit.

3. The switching power supply device according to claim 1, wherein the first switch element is turned on and off based on an output of the comparator.

4. The switching power supply device according to claim 1, wherein the one or more pull-up resistors includes a first pull-up resistor, and a second pull-up resistor that is connected in parallel to the first pull-up resistor by the first switch element.

5. A switching power supply device that includes a feedback terminal to which a feedback signal based on a load state is input and a comparator that compares a terminal voltage of the feedback terminal with a reference voltage and determines whether the load state is a normal load state or a light load state, the switching power supply device causing one or more switching elements to continuously execute a switching during the normal load state and causing the one or more switching elements to stop the switching operation during the light load state, the switching power supply device comprising:

an input voltage detecting circuit that detects whether an input voltage is high or low; and one or more pull-up resistors that are connected to the feedback terminal;

the one or more switching elements including a first switch element that switches a resistance value of the one or more pull-up resistors based on the change of the load state; and the one or more switching elements including a second switch element that switches the resistance value of the one or more pull-up resistors based on whether the input voltage is high or low.

6. The switching power supply device according to claim 5, further comprising a switching circuit that switches a value of the reference voltage based on the detection result of the input voltage detecting circuit.

7. The switching power supply device according to claim 5, wherein the first switch element is turned on and off based on an output of the comparator.

8. The switching power supply device according to claim 5, wherein the one or more pull-up resistors includes a first pull-up resistor, and a second pull-up resistor that is connected in parallel to the first pull-up resistor by the first switch element.

\* \* \* \* \*